United States Patent [19]
Herbert, Jr.

[11] Patent Number: 4,559,240
[45] Date of Patent: Dec. 17, 1985

[54] METHOD FOR REPAIRING FIBERGLASS BOAT HULLS

[76] Inventor: Kenneth Herbert, Jr., 2894 Pringle St., Stark Industrial Park, Charleston, S.C. 29405

[21] Appl. No.: 705,619

[22] Filed: Feb. 26, 1985

Related U.S. Application Data

[63] Continuation of Ser. No. 554,573, Nov. 23, 1983, abandoned.

[51] Int. Cl.⁴ .............................................. B32B 35/00
[52] U.S. Cl. .................................. 427/140; 427/282; 427/386
[58] Field of Search .............. 427/140, 282, 290, 322, 427/386; 156/94, 98

[56] References Cited

U.S. PATENT DOCUMENTS

| | | | |
|---|---|---|---|
| 3,932,681 | 1/1976 | Forker et al. | 427/282 |
| 4,165,397 | 8/1979 | Ogden et al. | 427/140 |
| 4,235,952 | 11/1980 | Holmes et al. | 427/140 |
| 4,409,270 | 10/1983 | Faber et al. | 427/140 |

Primary Examiner—Sadie L. Childs
Attorney, Agent, or Firm—B. Craig Killough

[57] ABSTRACT

A method is disclosed of repairing and resurfaced fiberglass boat hulls which have become worn or abraded, by applying an epoxy material to the boat hull, and distributing said epoxy in one manual stroke by means of a template so as to repair the hull, increasing abrasion resistance while not impairing the boat's performance.

6 Claims, 7 Drawing Figures

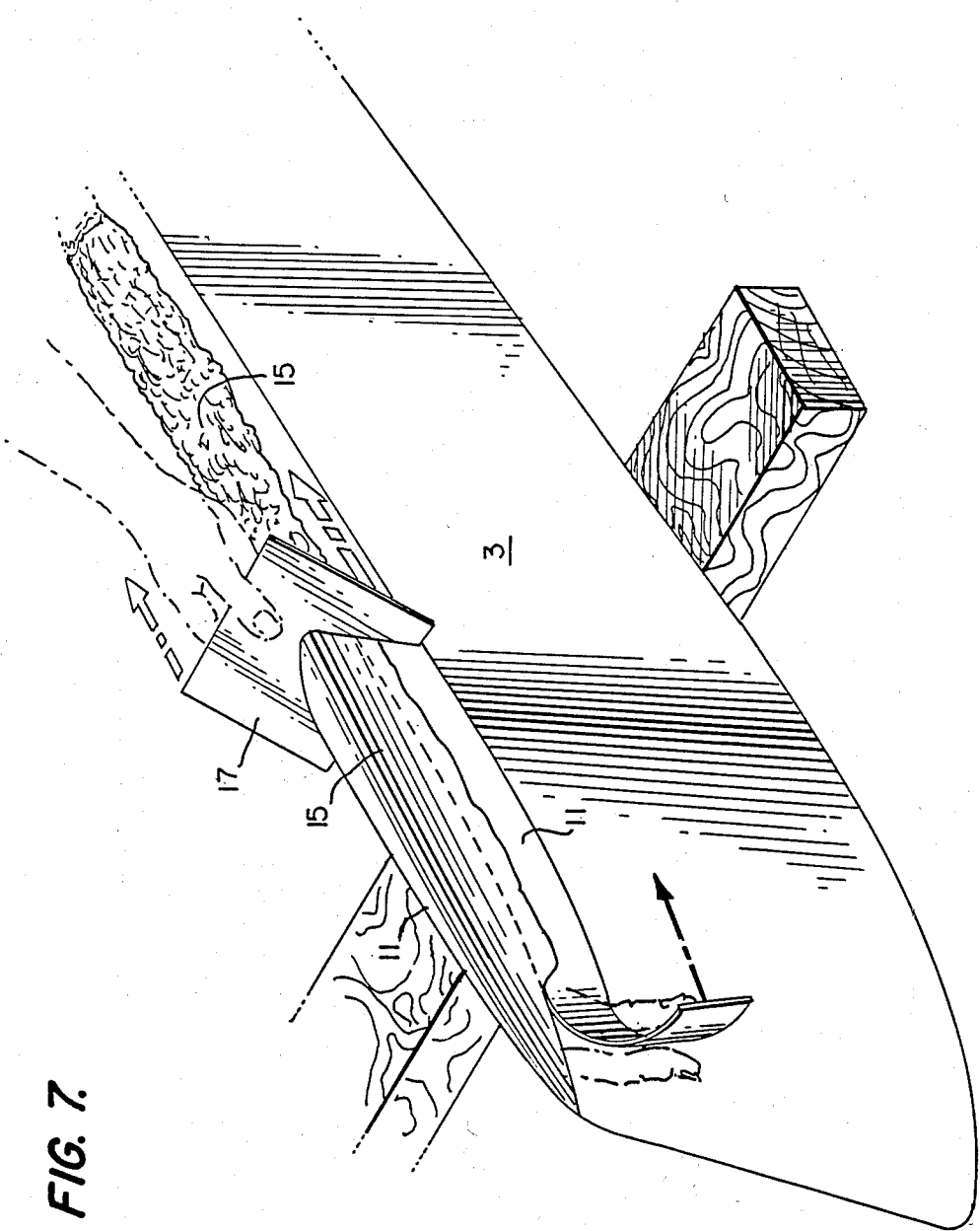

METHOD FOR REPAIRING FIBERGLASS BOAT HULLS

This application is a continuation of Application Ser. No. 554,573, filed Nov. 23, 1983, now abandoned.

SUMMARY AND BACKGROUND OF INVENTION

This invention relates generally to a method for repairing fiberglass boat hulls and more specifically to a method for repairing boat hulls which have become worn due to abrasion from sand and other materials.

Fiberglass boat hulls are particularly subject to abrasion. Contact with sand or mud, abrasions from docks or just general wear can cause the outer surface or gel coat to be stripped away.

Most commonly, the hulls of catamaran type boats are abraded from being pushed upon beach sand. These boats are typically 14 to 18 feet in length, and have two fiberglass pontoons which are generally "V" shaped on the bottom or keel. Sailors will push these boats up onto beach sand, or will gain velocity under sail and run them up onto the beach. The beach sand causes significant wear upon the fiberglass pontoons, particularly at the point of the "V".

The prior art has not provided a satisfactory way of repairing these boat hulls. New gel coat can be applied, but it is no more wear resistant than the original material, while being messy, time consuming and requiring a particular expertise to achieve satisfactory results. Epoxies and other compounds have been used, but heretofore no satisfactory way of reproducing the original hull shape and characteristics has existed without time consuming and tedious shaping of the material, or significant postcuring finishing.

Briefly, this invention involves the masking of the sides of the boat hull to each side of the worn area which is near the point of the "V". A wear resistant epoxy is then liberally applied to the exposed worn area. A template is then used to smooth the epoxy and form it to the desired shape in one step by pulling the template along the length of the hull. The masking material is then removed and the epoxy is allowed to dry.

The present invention allows the original shape of the hull to be reproduced while requiring only one forming and shaping step which takes only a few seconds to perform. It requires no thermosetting and no pressure other than manual pressure. It requires no post finishing work such as sanding, filling or trimming. While the method uses known epoxy material, is simple to use and requires no special tools, the use of the single template to shape and form the epoxy unexpectedly produces a repaired hull which matches the new fiberglass hull for speed and performance while being superior to the new hull in wear and abrasion resistance when metal or ceramic based epoxies are used.

While epoxies will not always bond to fiberglass, they have previously been used for fiberglass repair. However, until the present invention, the prior art has not produced a method which allows for fiberglass repair using epoxy to reproduce a particular, defined shape over an extended length which can be accomplished in one shaping and finishing step and which requires no subsequent finishing.

DESCRIPTION OF THE DRAWINGS

FIG. 7 is a perspective, action view showing epoxy grossly placed on the masked boat hull, with a template being pulled across the boat hull so as to smooth and shape the epoxy, and further showing the masking tape being removed to reveal the finished, resurfaced boat hull.

DESCRIPTION OF THE PREFERRED EMBODIMENTS

Figure 1:
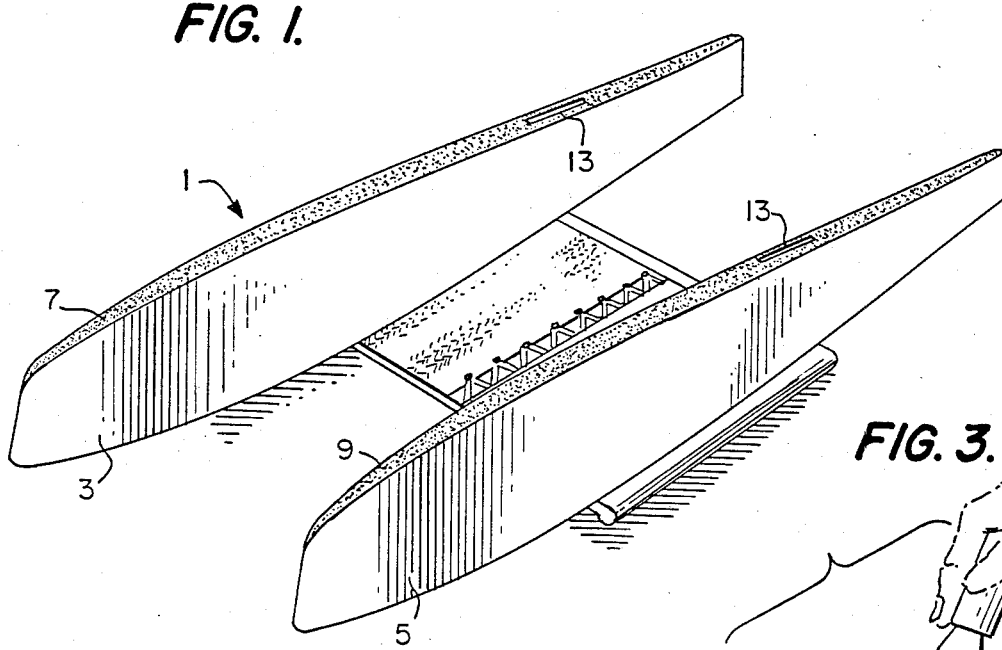
FIG. 1 is a perspective view of an inverted catamaran-type sail boat, with the mast removed, showing the worn areas of the hull.

In the preferred embodiment, the boat that will most commonly be repaired will be a 14 to 18 foot catamaran, such as a Hobie Cat.[1] The point of the "V" of the fiberglass boat hull will be abraded and worn from contact with an abrasive material such as beach sand. A boat 1 similar to a Hobie Cat is shown in FIG. 1, being in an inverted position with the mast removed. The hulls 3,5 have a worn area 7,9 near the point of the 'V'.

[1]. Registered Trademark.

Figure 2:
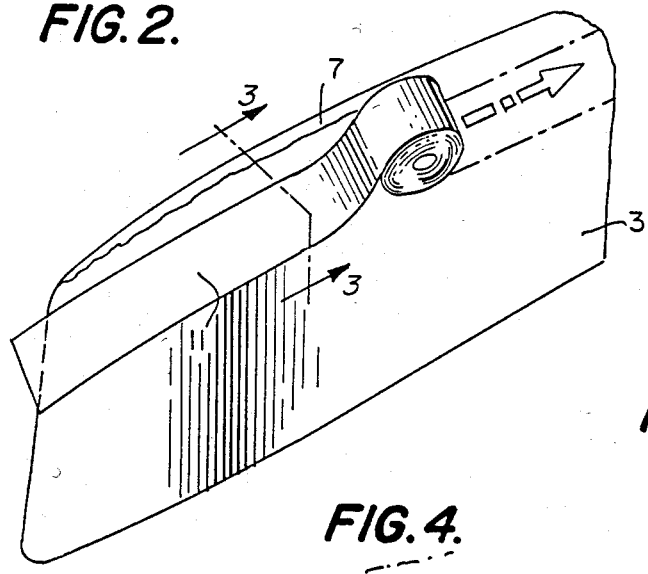
FIG. 2 is a partial, perspective view of an inverted boat hull, showing masking tape being applied to the hull.

Masking, which is typically masking tape 11 two or more inches in width is applied to each side of the worn area of hull 3, leaving the worn area 7 exposed, as in FIG. 2. The worn area 7 is then sanded with coarse sandpaper, such as #80 grit sandpaper. If there is a hole 13 in the hull through which the center board is inserted, the hole 13 should be shielded by placing a cardboard mask over the hole 13 and taping it in place.

An epoxy is then liberally applied to cover completely the exposed (unmasked) area over and around the point of the "V".

Figure 3:
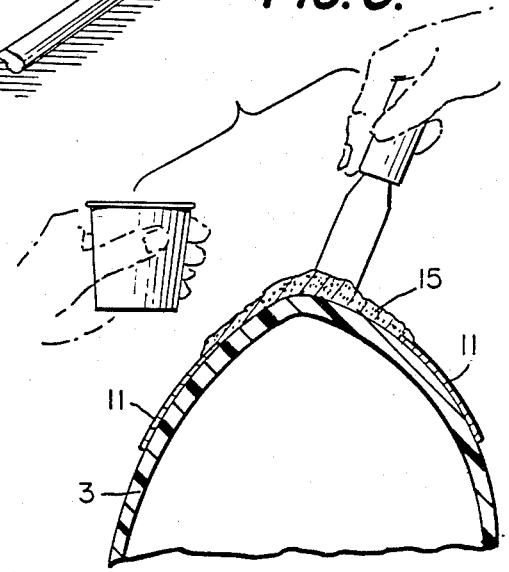
FIG. 3 is an elevated, sectioned view of an inverted boat hull, showing the application of the epoxy material.

A ceramic or hard metal epoxy 15, such as Devcon[2] Stainless Steel Putty or Devcon Wear Resistant Putty (a carbide and epoxy based putty), which have superior abrasion and wear resistant properties is preferred. The epoxy is mixed according to the manufacturer's instructions or until the consistency is smooth. A liberal amount is then applied to the worn area so that the epoxy 15 entirely covers the area which has been left exposed after masking, as in FIG. 3, so that the material may be formed along the entire length of the abraded portion of hull.

[2]. Registered Trademark of the Devcon Corporation

A template 17 having a void in the shape of the point or "V" of the boat hull 3 is then used to immediately smooth and form the epoxy material 15. Templates are designed for particular boats and will be shaped for a particular lenght and model of boat. The template 17 is used to smooth the epoxy 15 by pulling it the entire length of the boat hull, while applying manual pressure to the template 17. After the epoxy material 15 is smoothed with the template 17, the masking tape 11 is removed. After the epoxy sets, but before it cures (dries completely), the shield is removed from the center board box or hole 13. The epoxy 15 is now allowed to dry completely, and the boat is again ready for use. The procedure is the same for the remaining hull 5, and may be performed simultaneously.

Figure 4:
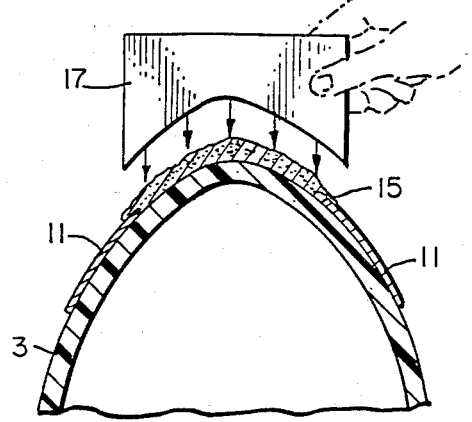
FIG. 4 is an elevated, sectioned view of an inverted boat hull showing the template which is used to smooth and form the epoxy material.
Figure 5:
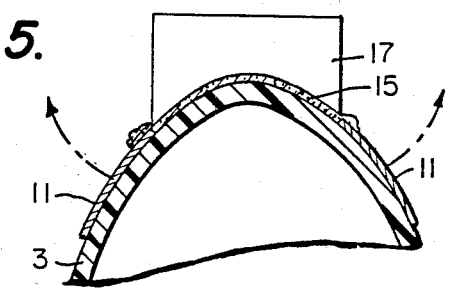
FIG. 5 is an elevated, sectioned view of an inverted boat hull, showing the template being used and indicating the removal of the tape after forming of the epoxy material.
Figure 6:
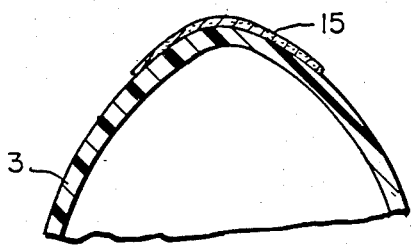
FIG. 6 is an elevated, sectioned view of the inverted hull upon completion.

Template 17 may be made from a sheet of most any material, which in the preferred embodiment is heavy card board. As shown in FIG. 4, a void 20 is cut into the card board which is an offset of the hull shape. That is, the shape of the void 20 duplicates the shape of the hull 3 in the plane shown in FIG. 4. It is preferable to produce the master template from a new boat of identical length by the same manufacturer.

FIG. 7 shows most of the process in one view. On the right hand side of FIG. 7, excess epoxy 15 has been grossly placed on the exposed portion of the boat hull 3, which has been prepared and masked as set forth above. Template 17, shaped as set forth above, is then pulled across the excess and grossly applied epoxy 15, to smooth and shape the epoxy 15, as shown on the portion of the boat hull to the left of template 17. The exposed portion of the boat hull has now been resurfaced and smoothed by template 17, with no post-finishing step required. Masking tape 11 is then removed from each side of the boat hull after the epoxy 15 is smoothed by template 17, leaving a well-defined line or border so as to achieve a good aesthetic appearance. Other than allowing the epoxy to set, no post-finishing steps are required. The worn, abraided boat hull has been resurfaced, and the boat hull now has its original shape and performance characteristics, while being superior to a new fiberglass hull in abrasion resistance.

While the shape and contour of the hull at the point of the "V" varies from stem to stern, on most catamarans the shape and contour is consistent along the middle 70% of the length. Since there is an upward curvature at each end, the center is also the portion which contacts the beach sand and which is subject to abrasion and wear. The single template is therefore able to reproduce the original hull shape along the subject worn or abraided area with only one stroke of the template along the uncured repair material.

After repair, the boat hull is more resistant to abrasion than it was when new. At the same time, no loss of boat speed or performance results from the repair of the boat hull in this manner. This process may be quickly and easily accomplished, even by those not experienced in working with fiberglass or fiberglass boat hulls.

The process described herein leads to new and unexpected results in that the damaged worn or abraided boat hull may be repaired and resurfaced along substantially the entire length with only one smoothing and shaping step. Unlike other methods presently in use, no thermosetting or pressure (other than manual pressure) is necessary, and absolutely no postfinishing or postcuring steps such as sanding, trimming, shaping or filling are necessary.

Other types of putties and epoxies may be used. It has been found, however, that epoxies having ceramic or hard metal bases are preferred due to their abrasion resistant and wear resistant properties.

This method may be used for repairing boat hulls other than catamarans and may be used to repair other fiberglass products.

What is claimed is:

1. A method for repairing, resurfacing and/or finishing a fiberglass boat hull which has become worn, damaged or abraided, consisting of:
    (a) preparing said hull for repairing, resurfacing and/or finishing by masking said hull along the length of said hull on each side of an area to be repaired, resurfaced or finished, while leaving said area exposed;
    (b) applying a quantity of prepared epoxy material along the length of said hull so as to cover said area and so that excess epoxy material is present;
    (c) preparing a template from a sheet of material by forming a void in said template which duplicates the shape of said hull;
    (d) distributing and finishing said epoxy material by pulling said template from one end of the length of said hull to the opposite end of said hull in one manual stroke while applying pressure to said template so as to smooth and shape said epoxy;
    (e) removing said masking material; and
    (f) allowing said epoxy material to set.

2. A method for repairing, resurfacing and/or finishing fiberglass boat hulls, as described in claim 1, wherein said epoxy further comprises a hard metal base.

3. A method for repairing, resurfacing and/or finishing fiberglass boat hulls, as described in claim 1, wherein said epoxy further comprises a ceramic base.

4. A method for repairing, resurfacing and/or finishing fiberglass boat hull which has become worn, damaged or abraided, consisting of:
    (a) applying a quantity of prepared epoxy material along the length of said hull over an area to be repaired, resurfaced and/or finished so as to cover said area and so that excess epoxy material is present;
    (b) preparing a template from a sheet of material by forming a void in said template which duplicates the shape of said hull;
    (c) distributing and finishing said epoxy material by pulling said template from one end of the length of said hull to the opposite end of said hull in one manual stroke while applying pressure to said template so as to smooth and shape said epoxy; and
    (d) allowing said epoxy material to set.

5. A method for repairing, resurfacing and/or finishing fiberglass boat hulls, as described in claim 4, wherein said epoxy further comprises a hard metal base.

6. A method for repairing, resurfacing and/or finishing fiberglass boat hulls, as described in claim 4, wherein said epoxy further comprises a ceramic base.

* * * * *